United States Patent [19]

Oneyama et al.

[11] 3,955,597
[45] May 11, 1976

[54] POPPET TYPE CHANGE-OVER VALVE ASSEMBLY

[75] Inventors: Naotake Oneyama; Hidetsuugu Fujitani, both of Soka, Japan

[73] Assignee: Shoketsu Kinzoku Kogyo Kabushiki Kaisha, Tokyo, Japan

[22] Filed: Nov. 5, 1974

[21] Appl. No.: 521,141

[30] Foreign Application Priority Data
Nov. 7, 1973  Japan............................ 48-125143

[52] U.S. Cl..................... 137/625.25; 137/625.48; 137/625.66; 251/DIG. 1
[51] Int. Cl.².......................................... F16K 11/00
[58] Field of Search................. 137/625.25, 625.67, 137/625.48, 625.5, 625.65, 625.66, 625.27, 375, 516.25, 516.27, 516.29; 251/282, 281, 357, DIG. 1

[56] References Cited
UNITED STATES PATENTS

| | | | |
|---|---|---|---|
| 125,532 | 4/1872 | Bourne | 251/357 |
| 1,653,202 | 12/1927 | Bubla | 137/375 X |
| 2,580,455 | 1/1952 | Myers | 251/357 X |
| 2,920,653 | 1/1960 | Wolff | 137/625.48 X |
| 3,771,562 | 11/1973 | Curran | 137/625.48 X |

FOREIGN PATENTS OR APPLICATIONS

| | | | |
|---|---|---|---|
| 1,206,129 | 5/1958 | France | 137/625.25 |
| 542,453 | 1/1942 | United Kingdom | 137/625.25 |
| 1,365,201 | 4/1963 | France | 137/625.27 |

*Primary Examiner*—William R. Cline
*Assistant Examiner*—Robert J. Miller
*Attorney, Agent, or Firm*—James C. Haight

[57] ABSTRACT

A poppet type change-over valve assembly suitable for switching a fluid flow direction and capable of dealing with a large fluid flow with a small valve displacement and small valve operating force. The valve assembly characteristically comprises an annular float valve which is loosely mounted around a main valve body and has parallel or concentric outer and inner sealing edges for engagement with conical valve seats which are formed on the main valve body and an inner wall surface of the valve casing. The annular float valve is adapted to be tightly held between the conical valve seats of the main valve body and the valve casing by cooperation of the main valve body and a fluid pressure prevailing in the valve chamber when the valve is switched to a desired change-over position thereby establishing a tight seal around the main valve body for connecting a fluid inlet port with a selected fluid output port of the valve.

19 Claims, 9 Drawing Figures

POPPET TYPE CHANGE-OVER VALVE ASSEMBLY

BACKGROUND OF THE INVENTION

Field of the Invention

This invention relates to a change-over valve assembly for switching a direction of a fluid flow, and more particularly to a poppet-seal type change-over valve assembly which is capable of switching a direction of a fluid flow in a simple and secure manner.

Existing change-over valves are largely classified into two types, that is, spool type valves and poppet type valves. A spool valve has its spool; advantages that (a) it requires a reduced number of component parts and therefore simple in construction; (b) it allows multi-directional and multi-positional change-over operations simply by altering various dimensions of a single spool; and (c) it can easily be adapted into a pressure-balanced construction which permits appreciable reductions in the required valve operating force and can cope with a relatively large fluid flow especially when a direct actuation type electromagnetic valve operating system is used. However, the spool valve has inherent drawbacks that (a) it is difficult to establish a secure fluid seal on the sliding portions of the spool, (b) the fluid drains and dusts or foreign matter in the fluid are apt to creep into the sliding portions and contribute to increase the frictional resistance of the spool to an abnormally high level as will cause operational failures of the valve and as will lead to a burning loss of a solenoid where a direct actuation type electromagnetic valve operating system is employed, unless the quality of the fluid is controlled with utmost care.

On the other hand, a poppet valve has advantages that (a) it can seal the fluid in a secure manner; (b) a large fluid flow is obtained by a small displacement of the valve; and (c) it is free from operational failures due to fluid drains and dusts and does not require prohibitively strict quality control of the fluid. However, with the existing poppet valves, difficulties are encountered in that (a) it is difficult to fabricate the valve in a pressure-balanced construction which requires only a minimized operating force; and (b) in order to effect the change-over operation in more than three directions or at more than three positions, it is necessary to employ a corresponding number of valve units, resulting in a valve assembly which has an increased number of component parts and which is disadvantageously large in size and high in production cost.

The spool valves and poppet valves are contrastive to each other in operational characteristics as mentioned hereinabove and are therefore used for different purposes in practical applications. It is the general practice to employ a spool valve for a change-over operation in more than three directions and to employ a poppet valve for a change-over operation in less than three or in two directions. There exists a four-directional or four-ways poppet type change-over valve which is constituted by a number of two- or three-way valve units or by a shaft carrying a number of poppet valve seats in a manner similar to spool valves. However, the former is disadvantageous in that it requires an increased number of component parts and complicated construction for providing passages interconnecting the respective valve units, resulting in a valve assembly of an unduly large size and high production cost. The latter may be provided in a small size like the spool valves but has a drawback that it is difficult to distribute an axially acting valve operating force uniformly to a number of poppet seal portions as components of the operating force.

It is therefore an object of the present invention to provide a poppet type change-over valve assembly which has a simple construction comparable to spool valves and which requires only a small amount of operating force for establishing a secure and tight valve seal.

It is another object of the present invention to provide a poppet type change-over valve assembly which can deal with even a contaminated fluid without inviting operational failures of the valve.

It is still another object of the present invention to provide a poppet type change-over valve which can operate either as a single-operation type change-over valve or double-operation type change-over valve as the case may be with slight dimensional modifications.

In one preferred form of the invention, the poppet type change-over valve assembly comprises a valve casing interiorly defining a generally cylindrical valve chamber and having valve guiding cavities at opposite ends thereof and a pair of opposingly disposed conical valve seats; a main valve body slidably received in said valve chamber and having sliding end portions in hermetical engagement with walls of said valve guiding cavities of said valve casing and a pair of opposingly disposed conical valve seats provided between said sliding end portions in face to face relation with said conical valve seats of said valve casing; an annular float valve loosely mounted around said main valve body and having parallel outer and inner sealing edges for engagement with said conical valve seats of said valve casing and said main valve body;

said conical valve seats of said main valve body and valve casing and said float valve being in a dimensional relationship dictated by an inequality $\psi° < 180° - \theta° < \phi°$ where $\psi°$ is a cone angle defining the conical valve seats of said main valve body, $\phi°$ is a cone angle defining the conical valve seats of said valve casing, and $\theta°$ is a cone angle containing two diagonally disposed sealing edges of said float valve;

a valve biasing means for urging said main valve body to assume a first change-over position; and a valve operating means provided at one end of said valve casing for shifting said main valve body into a second change-over position against action of said valve biasing means; said float valve being tightly held between said conical valve seats of said main valve body and said valve casing by the action of said main valve body and a fluid pressure prevailing in said valve chamber when said main valve body is shifted to either said first or second change-over position, thereby establishing a tight seal around said main valve body for connecting a fluid inlet port with a selected fluid output port.

In another preferred form of the invention, the poppet type change-over valve assembly comprises; a valve casing interiorly defining a generally cylindrical valve chamber and having valve guiding cavities at opposite ends thereof and a pair of opposingly disposed conical valve seats; a main valve body slidably received in said valve chamber and having sliding end portions in hermetical engagement with said valve guiding cavities of said valve chamber and a pair of opposingly disposed conical valve seats provided between said sliding end portions in face to face relation with said conical valve seats of said valve casing; an annular float valve loosely mounted around said main valve body and having parallel outer and inner sealing edges for engagement with said conical valve seats of said valve casing and said main valve body;

said conical valve seats of said main valve body and valve casing and said float valve being in a dimensional relationship as defined hereinbefore;

a valve biasing means for urging said main valve body to assume a first change-over position; a valve operating means provided at one end of said valve casing for shifting said main valve body into a second change-over position against action of said valve biasing means; and a fluid exhaust passage extending axially through said main valve body and opening into said valve chamber through a radial port between said paired conical valve seats of said main valve body; said float valve being tightly held between said conical valve seats of said main valve body and said valve casing by the action of said main valve body and a fluid pressure prevailing in said valve chamber when said main valve body is shifted either said first or second change-over position, thereby establishing a seal around said main valve body for connecting a fluid inlet port with a selected fluid output port while communicating a switched-off fluid output port with an exhaust port through said fluid exhaust passage in said main valve body.

In still another preferred form of the invention, the poppet type change-over valve assembly comprises; a valve casing interiorly defining a generally cylindrical valve chamber and having valve guiding cavities at opposite ends thereof and a pair of opposingly disposed conical valve seats; a main valve body slidably received in said valve chamber and having sliding end portions in hermetical engagement with walls of said valve guiding cavities of said valve casing and a pair of opposingly disposed conical valve seats provided between said sliding end portions in face to face relation with said conical valve seats of said valve casing; an annular float valve loosely mounted around said main valve body and having parallel outer and inner sealing edges for engagement with said conical valve seats of said valve casing and said main valve body;

said conical valve seats of said main valve body and valve casing and said float valve being in a dimensional relationship as defined hereinbefore;

a valve biasing means for urging said main valve body to assume a first change-over position; a float valve guiding means for maintaining said float valve in coaxial alignment with said main valve body; and a valve operating means provided at one end of said valve casing for shifting said main valve body into a second change-over position against the action of said valve biasing means; a fluid exhaust passage extending axially through said main valve body and opening into said valve chamber through a radial port provided between said paired conical valve seats on said main valve body; said float valve being tightly held between said conical valve seats of said main valve body and said valve casing by cooperation of said main valve body and a fluid pressure prevailing in said valve chamber when said main valve body is shifted to either said first or second change-over position, thereby establishing a tight seal around said main valve body for connecting a fluid inlet port with a selected fluid output port while communicating a switched-off fluid output port with an exhaust port through said fluid exhaust passage in said main valve body.

One of the features of the present invention resides in that a float valve is mounted floatingly in a space between the valve casing and the main valve body. In the first and second change-over positions, a valve seal established by the float valve, the conical valve seats on the casing and the main valve body is maintained securely by a combined action of a force applied by a suitable valve operating mechanism and a supplied fluid pressure acting on the float valve per se. The main valve body may be shifted from the first change-over position to the second change-over position or vice versa by means of an extremely small operating force regardless of the magnitude of the fluid pressure acting on the float valve.

Moreover, since the float valve is mounted loosely with respect to the main valve body in such a manner that the fluid pressure acting on the float valve would not give any influence on the operation of the main valve body, the valve can be imparted with a pressure-balanced construction as in balanced spool type change-over valves or can operate as a single-action type change-over valve which returns to an initial position under the influence of a fluid pressure or as a self-retaining double-action type change-over which is continuedly retained in a switched position under the influence of the fluid pressure. The valve assembly of the invention can thus serve for various purposes owing to its high versatility in function.

Furthermore, the change-over valve according to the present invention has the advantages of both the existing spool type valves and the poppet type valves without inheriting their inherent drawbacks as mentioned hereinabove.

BRIEF DESCRIPTION OF THE DRAWINGS

The above and other objects, features and advantages of the present invention will become apparent from the floow detailed description and the appended claims, taken in conjunction with the accompanying drawings which show by way of example preferred embodiments of the invention and wherein:

DESCRIPTION OF PREFERRED EMBODIMENTS

Figure 1:
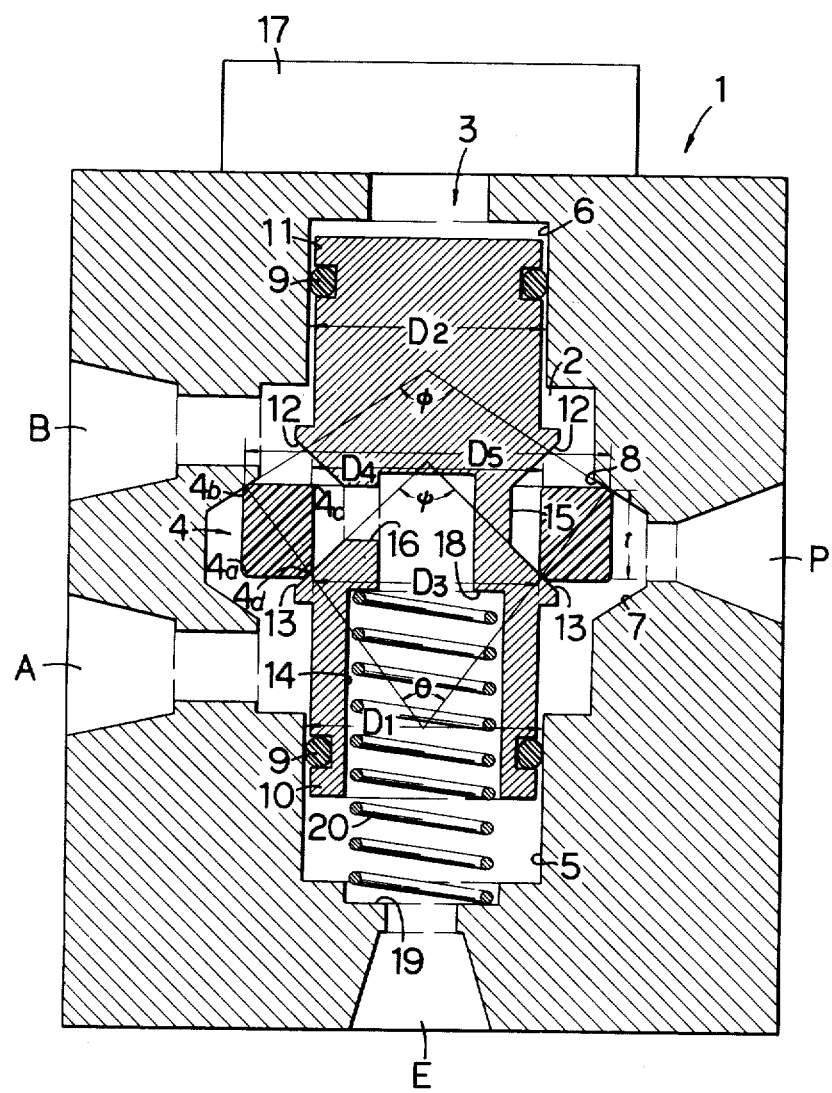
FIG. 1 is a longitudinal cross-section of a poppet type change-over valve assembly embodying the present invention.
Figure 2:
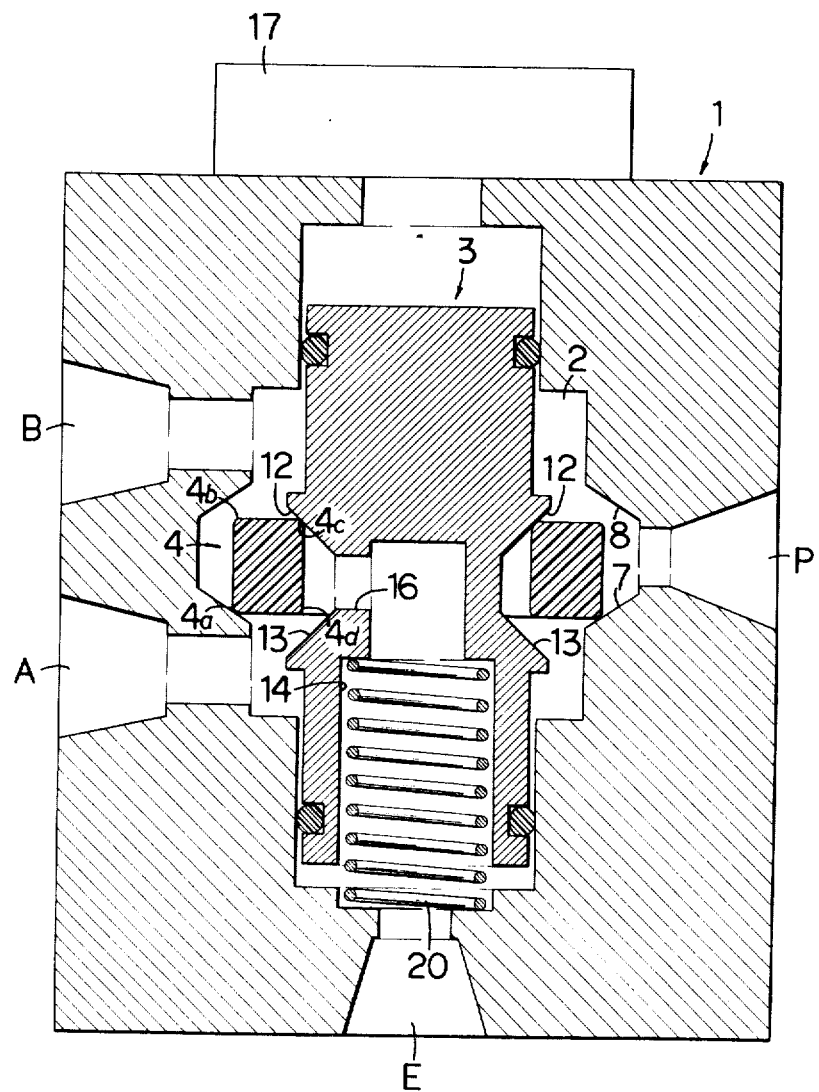
FIG. 2 is a view similar to FIG. 1 but showing the valve in a different change-over position.

Referring to the accompanying drawings and first to FIG. 1 and 2, the change-over valve assembly of the invention includes a valve casing 1 which interiorly has a generally cylindrical valve chamber 2. The valve chamber 2 has accommodated therein a main valve body 3 slidably in the axial direction and a floating valve 4 which is loosely fitted around the main valve and trapped in a floating space defined by opposingly disposed valve seats on the valve casing 1 and the main valve body 2 as will be described in greater detail hereinafter.

The valve casing 1 which defines the valve chamber 2 is formed with a fluid inlet port P, outlet or output ports A and B, and an exhaust port E, respectively in communication with the valve chamber 2. The valve chamber 2 includes cylindrical end cavities 5 and 6 which are in engagement with cylindrical end portions of the main valve 3 for guiding the axial sliding movement of the main valve 3 in the valve chamber 2. The valve casing 1 is interiorly formed with a pair of angularly disposed conical valve seats 7 and 8 forming an annular groove of trapezoidal cross-section on the inner periphery substantially intermediating the opposing ends thereof. The afore-mentioned inlet port P opens into the valve chamber 2 at a position between the conical valve seats 7 and 8, while the outlet ports A and B open into the valve chamber 2 at positions on opposite sides of the valve seats 7 and 8, respectively, and the exhaust port E opens into the outer end of the cylindrical cavity 5 which is shown at the bottom end of the valve chamber 2 in FIGS. 1 and 2. In the accompanying drawings, the valve casing 1 is shown as of a monoblock structure, however, it will be appreciated that a similar casing may be fabricated by connecting a number of structural materials of parts.

The main valve 3 which is slidably received in the valve chamber 2 is formed at the opposite ends thereof with cylindrical sliding portions 10 and 11 of the same diameter for sliding engagement with the afore-mentioned cylindrical cavities 5 and 6 of the valve casing 1 by way of O-rings 9. These O-rings 9 serve to hermetically seal the valve chamber 2 and may be replaced by other suitable means such as diaphragms, if desired. The main valve body 3 is formed with a pair of angularly disposed conical valve seats 12 and 13 forming an annular groove of trapezoidal cross-section on the outer periphery of the main valve body 3, opposingly or in face-to-face relationship to the afore-mentioned conical valve seats 7 and 8 on the inner periphery of the valve casing 1. The lower end portion of the main valve body 3 is hollowed to provide an axially extending intercommunicating passage 14 consisting of a cylindrical outer cavity of a larger diameter and a cylindrical inner caity of a smaller diameter. The intercommunicating passage 14 is connected to a radial port 16 formed in a smaller diameter portion 15 of the valve body 3 between the afore-mentioned conical valve seats 12 and 13.

The main valve body 3 may be fabricated by assembling two separate parts dividing the valve body at the smaller diameter portion 15, that is to say, a part including the valve seat 12 and the cylindrical end portion 11 and a part including the valve seat 13 and the hollow cylindrical end portion 10, by suitable means, for example, by threading connection, press-in engagement, adhesive connection or the like or connecting the two parts integrally with freedom by way of a pivotting fulcrum. Alternatively, the main valve body 3 may be provided in the form of a monoblock structure, if desired.

The flot valve 4 is in the form of a ring which is loosely fitted around the smaller diameter portion 15 of the main valve body 3 and trapped in a floating space defined by the paired conical valve seats 12 and 13 on the main valve body 3 and the another paired valve seats 7 and 8 on the inner periphery of the valve casing 1. The float valve 4 has four parallelling sealing edges 4a, 4b, 4c and 4d for intimate and tight engagement with the aforementioned conical valve seats 7, 8 12 and 13, respectively. The float valve 4 is shown in the drawing as having a rectangular or square cross-section, however, it may be profiled in an X-, round- or H-shape.

The float valve 4 may be obtained by molding a resilient material such as a nitril rubber into an annular shape, however, it may also be obtained by providing an outer layer of a resilient material on surfaces of a rigid ring structure by molding or adhesion coating. The float valve 4 may be a ring of a rigid material if the surfaces of the valve seats 7, 8, 12 and 13 and coated with a resilient material. Otherwise, the float valve 4 as well as the valve seats 7, 8, 12 and 13 may all be of rigid structure with a coating of a resilient material to ensure intimate sealing contact.

The change-over valve assembly of the present invention further includes a valve operating mechanism for moving the main valve from the position of FIG. 1 to the position of FIG. 2. The drawings show the valve operating mechanism 17 schematically by way of a block to represent all such means which are capable of applying a valve operating force from outside on the main valve body 3. In order to move the valve assembly including the main valve body 3 and the float valve 4 from one end of the valve chamber toward the other end, it is possible to employ known valve operating mechanisms which act on the main valve body, for example, by connecting and disconnecting a valve operating signal such as a fluid pressure, electromagnetic force, mechanical force or the like. A similar operating mechanism may be obtained for returning or moving the valve in the opposite direction, i.e., upwardly in the drawings, instead of a coil spring 20 employed in the particular embodiments shown. More particularly, the spring 20 is seated at one end on a stepped portion 18 between inner and outer cavities in the valve body 3 and at the other end on the outer end wall of the cylindrical cavity 5 of the valve chamber 2 for upwardly biasing the valve body 3.

The change-over valve with the above construction operates in the manner as will be discribed hereafter.

FIG. 1 shows the change-over valve in a position where the valve-operating mechanism 17 is disconnected from a operating power source and where the conical valve seat 13 of the valve body 3 is abutted against the edge 4d of the float valve 4 by virtue of the force of the return spring 20 acting on the main valve body 3 while the ridge 4b of the float valve 4 is abutted against the conical valve seat 8 on the inner surface of the valve casing 1. In this position (which will be referred to hereinafter as "first change-over position" for convenience of explanation), the edges 4b and 4d of the float valve 4 is securely held in sealing engagement with the conical valve seat 8 and 13, respectively, by the combined action of the return spring which urges the valve body 3 axially upwardly, as seen in FIG. 1, and the pressurized fluid which is introduced through the fluid inlet port P and acting on the float valve 4. On the other hand, in the first position of the change-over valve, the edges 4a and 4c of the float valve 4 are spaced away from the conical valve seats 7 and 12 on the inner surface of the valve casing 1 and the main valve body 3, respectively, to form therebetween an open passage. Therefore, the pressurized fluid entering the valve chamber 2 through the fluid inlet port P is allowed to flow through the open passage between the conical valve seat 7 and the float valve 4 and around the circumference of the main valve body 3 into the output port A. On the other hand, the fluid in the output port B is led through the open passage between the conical valve seat 12 and the float valve 4 and then through the port 16 and the intercommunicating passage 14 into the exhaust port E.

If a change-over signal is applied to actuate the operating mechanism 17 the main valve body 3 is moved, downwardly, as seen in FIG. 1, from the first position shown in FIG. 1. As soon as the main valve body 3 is shifted, the sealing engagement of the edges 4b and 4d of the float valve 4 with the conical valve seats 8 and 13 is broken and the float valve 4 is left in a floating state within the valve chamber 2. The main valve body 3 has a pressure-balanced construction as will be described in greater detail herein-later, so that it is completely free from influences of the pressurized fluid and may be shifted into the second change-over position of FIG. 2 by applying on the main valve body 3 an operating force which overcomes the action of the return spring 20. More particularly, in the second position of the change-over valve, the edges 4c and 4a of the float valve 4 are sealingly abutted against the conical valve seats 12 and 7 on the main valve body and on the inner surface of the valve casing 1, respectively. In other words, the float valve 4 is urged downwardly by means of the main valve body 3 against the conical valve seat 7 on the inner surface of the valve casing 1, securely by combined action of the operating force applied on the valve body 3 by the operating mechanism 17 against the action of the return spring 20 and the fluid pressure acting on the float valve 4 thereby to provide a firm seal.

In this second change-over position, the fluid from the inlet port P is led through the open passage formed between the conical valve seat 8 and the float valve 4 and then around the circumference of the main valve body 3 into the output port B. On the other hand, the fluid in the output port A is led through the open passage formed between the conical valve seat 13 and the float valve 4 and then through the port 16 and the intercommunicating passage 14 into the exhaust port E.

Description is now directed to the dimensional relationship between the respective valve components which characterize the change-over action of the valve as described hereinabove.

Firstly, the angle of the respective conical valve seats and the dimension of the float valve are, if the angle of conical valve seat 13 of the main valve body 3 is expressed by $\psi°$, the angle of the conical valve seat 8 of the inner surface of the valve casing 1 by $\theta°$ and the angle formed by straight lines passing through the diagonally disposed ridges 4b and 4d of the float valve 4 at radially opposing positions by $\theta°$, determined to satisfy the relation $$\psi° < 180° - \theta° < \theta° \tag{1}$$

wherein $$\theta° = \frac{360}{\pi} \cdot \tan^{-1}\left[\frac{D_5 - D_3}{2t}\right] \tag{2}$$

and $D_5$ represents an effective diameter or effective seat diameter of the edge 4b of the float valve, $D_3$ represents the effective seat diameter of the edge 4d and $t$ represents the effective length in the axial direction of the float valve 4 between the edges 4b and 4d thereof.

In this connection, the angles of the conical valve seats 7 and 12 are in the same relationship with respect to the edges 4a and 4c of the float valve 4.

The foregoing relations are necessary to ensure that the supplied fluid pressured be imposed on the sealing portions of the float valve in an amount sufficient for holding the float valve tightly between the conical valve seat on the side of the main valve body 3 and the valve seat on the side of the valve casing 1. The sealing force acting on the float valve is increased correspondingly to increases in the difference between $\theta°$ and ($180° - \theta°$) or between $\psi°$ and ($180°C - \theta°$), so that the sealing of the valve may be attained in a secure manner even if the force of the return spring 20 and the force applied by the operating mechanism 17 are small. Furthermore, the sealing force acting on the seals at the diagonally edges of the float valve can be suitably adjusted by independently varying the angles $\theta°$ and $\psi°$ to distribute the fluid pressure in a desired ratio to the two sealing portions of the valve and to establish the seals simultaneously. Where the relation of formula (1) is not satisfied, it becomes difficult to utilize the load of the fluid pressure as a sealing force and the sealing operation has to totally depend on an outer operating force.

With regard to the relation of the diameters in various portions of the valve assembly, the dimensional relation of the effective seat diameters $D_4$ and $D_3$ for the inner sealing edges 4c and 4d of the float valve with respect to the effective diameters of the upper and lower sliding portions $D_1$ and $D_2$ on the respective O-rings 9 may be $$D_1 = D_2 = D_3 = D_4 \tag{3}$$

with this relation, the main valve body 3 has a pressure-balanced structure and is completely free from biasing influence of the supplied fluid pressure which would otherwise be imposed thereon by the supplied fluid pressure in the first and second change-over positions or during the change-over operation, the valve body 3 acting in the same manner as in a balanced spool type change-over valve which requires only an extremely small operating force.

It will be understood from the foregoing description that, in the embodiment shown in FIGS. 1 and 2, the valve assembly is constructed to satisfy the formulae (1) and (3) so that it can depend on the fluid pressure acting on the float valve for most of the required sealing force, allowing the operating mechanism 17 and the return spring 20 to have only an appreciably small amount of force for valve operating purposes. During the period from initiation to completion of the change-over operation, the main valve body 3 and the floating valve 4 are maintained in a non-biased conditions so that exertion of only a small amount of force by the operating mechanism 17 or by the return spring 20 will suffice to change-over the valve body 3 from the first to the second position or vice versa since the fluid pressure within the valve assembly does not act as a resisting force during the change-over operation. In other words, the valve is constructed such that the fluid pressure is effectively imposed on the valve seat portions to ensure a large sealing force without imposing biasing force on the valve body in contradiction to the change-over operation. This makes it possible to change-over a flow of fluid of a large flow rate with a small operating force in a poppet type change-over valve.

Moreover, with the change-over valve assembly with the construction as mentioned above, the impact which is imposed on the valve at the time of change-over may be held to a minimum and absorbed in a suitable manner. In an ordinary spool type changeover valve involving valve displacement over a relative large distance, the end of the spool receives a great impact and therefore is susceptible to mechanical damages. In this connection, with poppet type change-over valves, the distance of displacement of the valve body is relatively small, however, the load is directed localizedly to the valve seat which therefore damaged or is worn out in an accelerated manner.

In contrast, the change-over valve of the invention as shown in FIGS. 1 and 2 has increased durability since it is, in addition to being of the poppet type with a small distance of valve displacement, constructed to hold the float valve 4 between the conical valve seats on the main valve body 3 and on the inner wall surface of the valve casing 1 for stopping the movement of the valve body 3 so that the change-over impact is absorbed by the resiliency of the sealing edges of the float valve 4 and at the same time by the resiliency of the ring-shaped float valve body as a whole. For this shock absorbing effect, the float valve 4 is preferred to be formed from a resilient material as mentioned hereinbefore.

Figure 3:
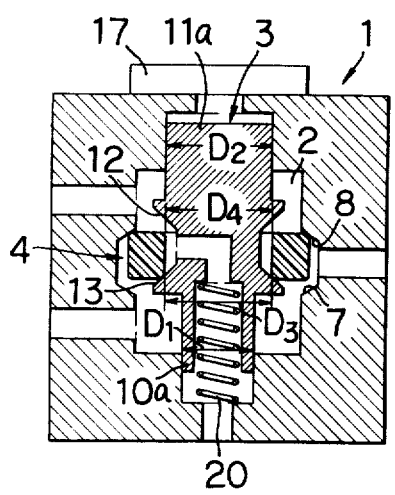
FIG. 3 is a longitudinal cross-section showing a modification of the poppet type change-over valve according to the present invention.
Figure 4:
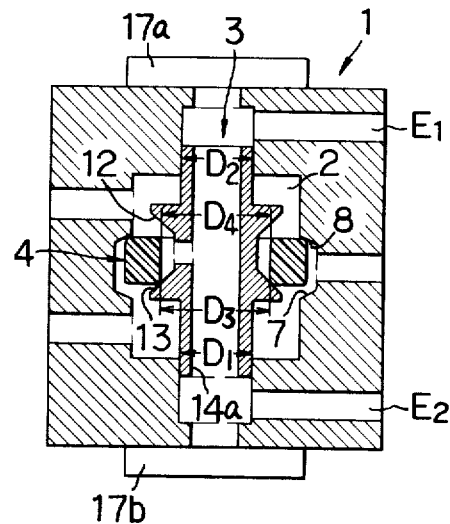
FIG. 4 is a longitudinal cross-section showing a further modification of the poppet type change-over valve according to the present invention.
Figure 5:
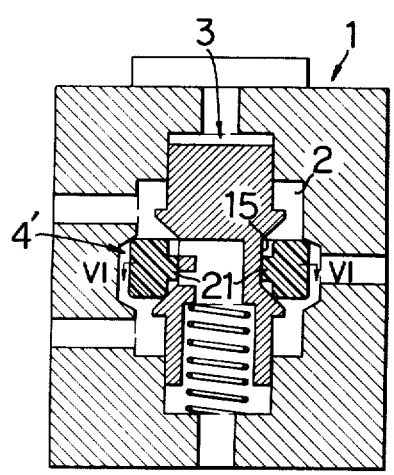
FIG. 5 is a longitudinal cross-section showing a construction of the float valve employed in the present invention.

Reference is now made to FIGS. 3 to 5 showing modified valve constructions which have been led from the basic form of the change-over valve assembly discussed hereinbefore.

Referring first to FIG. 3, there is shown a modification which includes alterations in dimensional relationship of the various diameters in the main operating parts of the change-over valve assembly. More particularly, in the embodiment of FIGS. 1 and 2, the upper and lower sliding portions 10 and 11 at opposite ends of the main valve body has the same diameter. However, the modified valve assembly of FIG. 3 has the lower cylindrical sliding portion 10a formed smaller in diameter than the upper cylindrical sliding portion 11a, to satisfy the following relation $$D_2 = D_3 = D_4 \, 22 \, D_1 \qquad (4)$$

Except for this alteration in diametrical relationship, the embodiment of FIG. 3 has the same construction as the basic form shown in FIGS. 1 and 2 and therefore similar parts are designated by similar reference numerals and characters.

In the first change-over position shown, the fluid pressure acts on the differencial surface area of the main valve body according to the difference between $D_3$ (= $D_4$ = $D_2$) and $D_1$ urging the main valve body 3 upwardly, as seen in the drawing, to aid the return spring 20 which holds the float valve 4 against its seats.

With this construction, it is possible to reduce the mounting load of the return spring 20 or to completely eliminate the return spring 20. While the valve body 3 is shifted from the first change-over position to the second change-over position, the valve body 3 has to be operated against the fluid pressure acting on the differential surface area of the valve body 3 due to the difference between $D_1$ and $D_2$. However, as soon as the valve body 3 assumes the second change-over position where $D_4 = D_2$, the countevacting fluid pressure disappears to allow the operating force to act effectively for holding the float valve securely against the conical valve seats. In this instance, if $D_2 > D_4$ in a slight degree, there will be produced a force which acts to urge the valve body 3 against the operating force in accordance with the differential area thus produced but which serves to return the valve body 3 to the first change-over position as soon as the operating force is removed.

In the embodiment of FIG. 3, the valve body 3 is returned from the second change-over position to the initial position almost without depending upon the action of the return spring, that is to say, the main valve body 3 returns to its first change-over position upon removing of the operating force which is imposed on the valve body 3 by the valve operating mechanism 17. This is advantageous especially when an operational failure due to breakage of the return spring 20 leads to a serious problem or dangerous impairment of the function of the circuit, the valve providing a single-action type safety construction.

FIG. 4 shows another modification which includes alterations in dimensional relation of the main parts of the valve. This modification differs from the basic form of the first embodiment in that the diameters $D_1$ to $D_4$ are held in the following relation $$D_3 = D_4 > D_1 = D_2$$

Furthermore, the intercommunicating passage 14a is provided through and along the entire length of the main valve body 3 and fluid exhaust ports $E_1$ and $E_2$ are provided at the opposite ends of the valve chamber 2 with two valve operating mechanisms 17a and 17b located at opposite ends of the valve body 3. The construction of the modification of FIG. 4 is same as the embodiment of FIGS. 1 and 2 in other respects so that similar parts are designated by similar reference numerals and characters.

In the change-over valve construction shown in FIG. 4, the fluid pressure acts on the differential surface areas of the main valve 3 according to the difference in diameter between $D_1$ ($D_2$) and $D_3$ ($D_4$) serving to hold the float valve against the conical valve seats in the first and second change-over positions, respectively. As $D_1 = D_2$, the valve body 3 receives a balanced fluid pressure during the change-over operation so that it may be shifted to either the first or second change-over position by applying an extremely small operating force and it may be held continuedly in the shifted position by the fluid pressure acting on $D_3$ or $D_4$ even if the operating force is removed after the valve body 3 has taken its seats. Namely, the embodiment of FIG. 4 operates as a double action type self-retaining changeover valve since the main valve body 3 is retained in the first or second change-over positions under the influence of the fluid pressure on $D_3$ or $D_4$.

Though there have thus far been described herein two typical examples of modifications which may be obtained by altering the dimentional relationship between the operating parts of the change-over valve assembly of the invention, it will be understood that various other modifications may be made by employing other dimenshional combinations to provide change-over valves with different functions to suit particular purposes.

Figure 6:
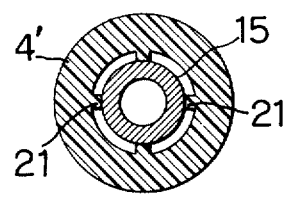
FIG. 6 is a cross-section taken along line VI — VI of FIG. 5.
Figure 7:
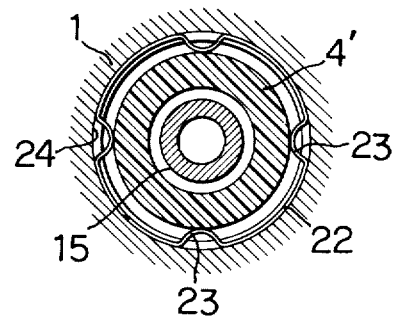
FIG. 7 is a cross-section showing a modified construction of a float valve guide means in a position similar to FIG. 6.
Figure 8:
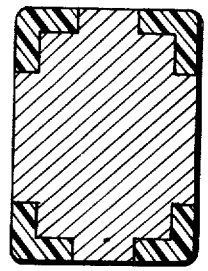
FIG. 8 is a cross section showing a modified construction of a float valve employed in the present invention.
Figure 9:
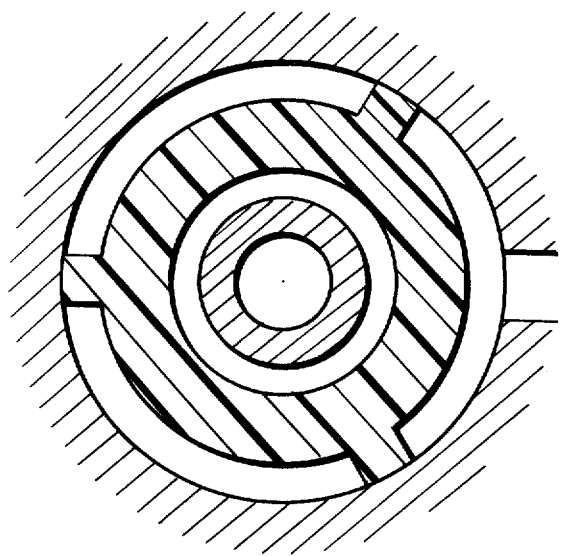
FIG. 9 is a cross section showing another modified construction of a float valve guide means in a position similar to FIG. 6.

FIGS. 5 to 7 show constructions of the float valve suitable for use in the change-over valve of the present invention described hereinabove.

The float valve 4 in the respective embodiment of the invention is basically and generally formed in a ring-shape with four parallel inner and outer sealing edges which are engaged with or disengaged from the respective valve seats for establishing a valve seal or to form an open fluid passage. For this purpose, the float valve 4 is loosely fitted between the respective valve seats mentioned hereinbefore. The float valve constructions of FIGS. 6 and 7 are particularly designed to prevent positional deviation of the float valve with respect to the main valve body 3 as radial misalignment of the float valve 4 would result in failures in providing secure change-over operations.

Referring to FIGS. 5 and 6, the float valve 4' is provided integrally on the inner periphery thereof with guide means in the form of a number of projections 21 which are adapted to be held in sliding engagement with the outer periphery of the main valve body 3. Alternatively, the float valve guide projections may be provided on the outer periphery of the ring-shaped float valve for sliding engagement with the inner wall surface of the valve casing 1. Otherwise, for the purpose of guiding the float valve 4, a ring pin member 22 with a number of inward projections 23 may be provided in an annular groove 23 which is formed in the inner wall surface of the valve casing 1, as particularly shown in FIG. 7, for sliding contact with the outer periphery of the float valve 4'. If desired, the float valve 4' may be supported by a diaphragm which has a fluid passage.

The float valve means in the form of projections, a pin or diaphragm should have a construction which can prevent radial positional deviation or misalignment of the float valve 4 with respect to the main valve body 3 without blocking fluid flows in the valve casing 1 and may be provided in other forms if these conditions are suitably met.

It will be clear from the foregoing description that the change-over valve of the invention may be operated suitably by existing hydraulic or pneumatic operating systems, mechanical operating systems or electromagnetic operating systems. Except for the particular cases as mentioned hereinbefore, the changeover valve construction of the invention can operate as of the single-action type or the double-action type. If a direct type electromagnetic operating system is employed for operating the valve of the invention, it is possible to change-over a large fluid flow with an extremely small amount of valve displacement. As only a small operating force is required for the valve displacement, a large capacity change-over valve may be obtained with use of an extremely small solenoid device. Where a hydraulic or pneumatic or pilot electromagnetic operating system is employed, the valve of the invention which inherently requires only a small operating force may be actuated simply by the pilot pressure of an appreciably low level and, if a large diameter pilot actuator with a diaphragm or the like is provided at one end of the valve body, it is also made possible to control the valve by small or low pressures.

Though the present invention has been herein illustrated by way of four-port change-over valves, it will be appreciated that the invention may be embodied in the form of three-port change-over valves with ease based upon the dimensional relations discussed hereinbefore.

What is claimed is:

1. A poppet type change-over valve assembly for switching a direction of a fluid flow, comprising:

a valve casing interiorly defining a generally cylindrical valve chamber and having valve guiding cavities at opposite ends thereof and a pair of opposingly disposed conical valve seats intermediate said cavities; said casing comprising a plurality of parts which communicate between said valve chambers and the casing exterior, including an input port disposed in said casing intermediate said casing's conical valve seats, a pair of output ports disposed in said casing on opposite sides of said casing's conical valve seats, and an exhaust port;

a main valve body slidably received in said valve chamber and having slide end portions in hermetical engagement with walls of said valve guiding cavities of said valve casing and a pair of opposingly disposed conical valve seats provided between said sliding end portions in face to face relation with said conical valve seats of said valve casing;

means communicating said outlet ports through said valve body with said exhaust port;

an annular float valve loosely mounted around said main valve body between said opposingly disposed conical valve seats of said valve casing and of said main valve body, said float valve having concentric outer and inner sealing edges for engagement with said conical valve seats of said valve casing and said main valve body;

said conical valve seats of said main valve body and valve casing and said float valve being in a dimensional relationship dictated by an inequality $\psi° < 180° - \theta° < \phi°$ (wherein $\psi°$ is a cone angle defining the conical valve seats of said main valve body, $\phi°$ is a cone angle defining the conical valve seats of said valve casing and $\theta°$ is a cone angle containing two diagonally positioned sealing edges of said float valve);

a valve biasing means for urging said main valve body to assume a first change-over position wherein said float valve is tightly held between one of said conical valve seats of said main body valve and said facing conical valve seat of said valve casing; and a valve operating means provided at one end of said valve casing for shifting said main valve body against the action of said valve biasing means into a second change-over position wherein said float valve is tightly held between the other of said conical valve seats of said main body valve and the other of said facing conical valve seats of said casing;

said float valve thus being tightly held between said conical valve seats of said main valve body and said valve casing by the action of said main valve body and a fluid pressure prevailing in said valve chamber when said main valve body is shifted to either said first or second change-over position, establishing a tight seal around said main valve body thereby communicating a selected one of said output ports with said input port while draining another one of said output ports though said exhaust port in said valve casing.

2. A poppet type change-over valve assembly as defined in claim 1, wherein each of said sliding end portions of said main valve body is surrounded by a sealing means for hermetical engagement with said valve guiding cavity of said valve casing.

3. A poppet type change-over valve assembly as defined in claim 1, wherein said float valve has a rectangular cross-section.

4. A poppet type change-over valve assembly as defined in chaim 3, wherein said float valve is formed from a resilient material.

5. A poppet type change-over valve assembly as defined in claim 3, wherein said float valve is formed from a rigid material and coated with a resilient material at least at said sealing edges.

6. A poppet type change-over valve assembly as defined in claim 1, wherein said valve biasing means comprises a coil spring mounted at one end of said valve casing opposite to said valve operating means, said coil spring acting on one end of said main valve body to urge the same into said first change-over position.

7. A poppet type change-over valve assembly as defined in claim 6, wherein said valve biasing means also includes a differential pressure receiving surface provided on said main valve body for urging the same into said first change-over position.

8. A poppet type change-over valve assembly as defined in claim 1, wherein said valve operating means is an electromagnetic device which is adapted to impose a valve operating force on the other end of said main valve body for shifting the same into said second change-over position against the action of said valve biasing means.

9. A poppet type change-over valve assembly as defined in claim 1, wherein said valve operating means is a hydraulic device which is adapted to impose a fluid pressure on the other end of said main valve body for shifting the same into said second change-over position against the action of said valve biasing means.

10. A poppet type change-over valve assembly as defined in claim 1, wherein said valve operating means is a pneumatic device which is adapted to impose a fluid pressure on the other end of said main valve body for shifting the same into said second change-over position against the action of said valve biasing means.

11. A poppet type change-over valve assembly as defined in claim 1, wherein valve operating means is a mechanical device which is adapted to impose a mechanical force on the other end of said main valve body for shifting the same into said second change-over position against the action of said valve biasing means.

12. A poppet type change-over valve assembly for switching a direction of a fluid flow, comprising:
a valve casing interiorly defining a generally cylindrical valve chamber and having valve guiding cavities at opposite ends thereof and a pair of opposingly disposed conical valve seats intermediate said cavities; said casing comprising a plurality of ports which communicate between said valve chamber and the casing exterior, including an input port disposed in said casing intermediate said casing's conical valve seats, a pair of output ports disposed in said casing on opposite sides of said casing's conical valve seats, and an exhaust port;
a main valve body slidably received in said valve chamber and having sliding end portions in hermetical engagement with said valve guiding cavities of said valve chamber and a pair of opposingly disposed conical valve seats between said sliding end portions in face to face relation with said conical valve seats of said casing;
an annular float valve loosely mounted around said main valve body between said opposingly disposed conical valve seats of said valve casing and of said main value body, said float valve having concentric outer and inner sealing edges for engagement with said conical valve seats of said valve casing and said main valve body;
said conical valve seats of said main valve body and valve casing and said float valve being in a dimensional relationship dictated by an inequality $\psi° < 180° - \theta° < \phi°$ (wherein $\psi°$ is a cone angle defining the conical valve seats of said main valve body, $\phi°$ is a cone angle defining the conical valve seats of said valve casing, and $\theta°$ is a cone angle containing two diagonally positioned sealing edges of said float valve);
a valve biasing means for urging said main valve body to assume a first change-over position wherein said float valve is tightly held between one of said conical valve seats of said main body valve and said facing conical valve seat of said valve casing;
a valve operating means provided at one end of said valve casing for shifting said valve body against the action of said valve biasing means into a second change-over position wherein said float valve is tightly held between the other of said conical valve seats of said main body valve and the other of said facing conical valve seats of said casing;
a fluid exhaust passage, in communication with said exhaust port, extending axially through a portion of said main valve body and opening into said valve chamber through a radial port between said paired conical valve seats of said main valve body;
said float valve thus being tightly held between said conical valve seats of said main valve body and said valve casing by the action of said main valve body and a fluid pressure prevailing in said valve chamber when said main valve body is shifted into either said first or second change-over position, establishing a tight seal around said main valve body thereby communicating a selected one of said output ports with said input port while draining another one of said output ports through said exhaust passage and said exhaust port in said valve casing.

13. A poppet type change-over valve assembly as defined in claim 12, further comprising a float valve guiding means for maintaining said float valve in coaxial alignment with said main valve body.

14. A poppet type change-over valve assembly as defined in claim 13, wherein said float valve guiding means comprises a number of projections extending radially inwardly from inner periphery of said annular float valve body and held in sliding engagement with the circumference of said main valve body.

15. A poppet type change-over valve assembly as defined in claim 13, wherein said float valve guiding means comprises a ring member anchored in an annular groove on the inner wall surface of said valve casing and having integrally therewith a number of projections extending radially inwardly in sliding engagement with the circumference of said float valve.

16. A poppet type change-over valve assembly as defined in claim 13, wherein said float valve guiding means comprises a number of projections integrally formed with said annular float valve and extending outwardly from outer periphery of said float valve for sliding contact with the inner wall surface of said valve casing.

17. A poppet type change-over valve assembly as defined in claim 12, wherein said sliding end portions of said main valve body and said float valve are in a dimentional relationship dictated by an equation $$D_1 = D_2 = D_3 = D_4$$

wherein $D_1$ and $D_2$ represent the effective diameters of the respective sliding end portions of said main valve body and $D_3$ represent an effective inner diameter of said float valve.

18. A poppet type change-over valve assembly as defined in claim 12, wherein said sliding end portions of said main valve body and said float valve are in a dimensional relationship of $$D_2 = D_3 = D_4 > D_1$$

wherein $D_1$ represents an effective diameter of one of said sliding end portions of said main valve body which is located remote from said valve operating means, $D_2$ represent an effective diameter of the other sliding end portion of said main valve body, $D_3$ and $D_4$ represents effective diameters of said conical valve seats of said main valve body.

19. A poppet type change-over valve assembly as defined in claim 12, wherein said sliding end portions of said main valve body and said float valve are in a dimensional relationship of $$D_3 = D_4 > D_1 = D_2$$

wherein $D_1$ and $D_2$ represent effective diameters of the respective sliding ends of said main valve body and $D_3$ and $D_4$ represent effective diameters of the respective inner sealing edges of said float valve.

* * * * *